(12) United States Patent
Gallant et al.

(10) Patent No.: US 11,226,201 B2
(45) Date of Patent: Jan. 18, 2022

(54) AUTOMATED MOBILE GEOTECHNICAL MAPPING

(71) Applicant: Queen's University at Kingston, Kingston (CA)

(72) Inventors: Marc Gallant, Kingston (CA); Joshua Marshall, Kingston (CA)

(73) Assignee: Queen's University at Kingston, Kingston (CA)

( * ) Notice: Subject to any disclaimer, the term of this patent is extended or adjusted under 35 U.S.C. 154(b) by 593 days.

(21) Appl. No.: 15/579,753

(22) PCT Filed: Jun. 10, 2016

(86) PCT No.: PCT/CA2016/050664
§ 371 (c)(1),
(2) Date: Dec. 5, 2017

(87) PCT Pub. No.: WO2016/197251
PCT Pub. Date: Dec. 15, 2016

(65) Prior Publication Data
US 2018/0180415 A1   Jun. 28, 2018

Related U.S. Application Data

(60) Provisional application No. 62/174,372, filed on Jun. 11, 2015.

(51) Int. Cl.
*G01C 15/00* (2006.01)
*G01C 21/20* (2006.01)
(Continued)

(52) U.S. Cl.
CPC .............. *G01C 15/00* (2013.01); *G01B 11/24* (2013.01); *G01C 17/16* (2013.01); *G01C 21/165* (2013.01);
(Continued)

(58) Field of Classification Search
CPC ............ G01C 15/00; G01S 17/89; G01V 7/06
See application file for complete search history.

(56) References Cited

U.S. PATENT DOCUMENTS

| 6,590,640 B1 | 7/2003 | Aiken et al. |
| 6,895,356 B2 | 5/2005 | Brimhall et al. |
(Continued)

FOREIGN PATENT DOCUMENTS

| CN | 104613947 A | 5/2015 |
| JP | 2007-113240 A | 5/2007 |

OTHER PUBLICATIONS

Chinese Office Action and Search Report dated Nov. 28, 2019 for corresponding Chinese Patent Application No. 201680033791.5.
(Continued)

*Primary Examiner* — Michael J Dalbo
(74) *Attorney, Agent, or Firm* — Stephen J. Scribner

(57) ABSTRACT

Provided are apparatus and methods for generating a representation of a physical environment, comprising: a mobile sensor platform (MSP) including sensors that output sensor signals relating to parameters such as range, gravity, direction of the Earth's magnetic field, and angular velocity. The MSP is adapted to be moved through the environment. The sensor signals are processed and observations of axes in the environment are generated for a sequence of time steps, the orientation of the MSP is estimated for each of the time steps, observed axes are identified at each orientation, and similar axes are associated. The orientations, the axes in the environment, and the directions of gravity and the Earth's magnetic field are linked such that each observation is predicted based on the estimates of the orientations. An estimate of the orientations is optimized and an output of the representation of the physical environment is generated based on the optimized orientation estimates. The output may be an axis map, a visual representation, and/or a data (Continued)

set. In one embodiment the output device may produce an output comprising a stereonet.

21 Claims, 15 Drawing Sheets

(51) Int. Cl.
*G01C 21/16* (2006.01)
*G01V 7/00* (2006.01)
*G01C 17/16* (2006.01)
*G01B 11/24* (2006.01)
*G01V 3/40* (2006.01)
*G01V 7/06* (2006.01)

(52) U.S. Cl.
CPC .............. *G01C 21/20* (2013.01); *G01V 3/40* (2013.01); *G01V 7/00* (2013.01); *G01V 7/06* (2013.01)

(56) References Cited

U.S. PATENT DOCUMENTS

| | | | |
|---|---|---|---|
| 8,055,026 B2 | 11/2011 | Pedersen | |
| 8,521,418 B2 | 8/2013 | Ma et al. | |
| 8,732,968 B2 | 5/2014 | Kang et al. | |
| 9,372,265 B2* | 6/2016 | Zweigle | G01B 11/002 |
| 2002/0060784 A1* | 5/2002 | Pack | G01S 17/89 356/6 |
| 2006/0006309 A1* | 1/2006 | Dimsdale | G01C 15/002 250/206.1 |
| 2006/0110026 A1 | 5/2006 | Strassenburg-Kleciak | |
| 2007/0247612 A1* | 10/2007 | Pack | G01S 17/08 356/4.01 |
| 2014/0123507 A1* | 5/2014 | Gupta | G01B 11/002 33/1 M |
| 2014/0314308 A2 | 10/2014 | Kitamura et al. | |
| 2015/0127298 A1* | 5/2015 | Gangumalla | A61B 5/1123 702/160 |
| 2015/0242314 A1* | 8/2015 | Hsu | G01C 19/00 702/141 |
| 2015/0316579 A1* | 11/2015 | Pakzad | G06F 3/0346 702/150 |
| 2017/0046840 A1* | 2/2017 | Chen | G06K 9/4604 |

OTHER PUBLICATIONS

European Search Report dated Dec. 19, 2018 for corresponding European Application No. 16806482.2 filed on Jun. 10, 2016.
International Search Report and Written Opinion dated Jul. 27, 2016 for corresponding International Application No. PCT/CA2016/050664, filed Jun. 10, 2016.
Maptek i-Site System http://www.maptek.com/products/i-site/index.html.
Kemeny, J. et al., "Ground-Based LiDAR Rock Slope Mapping and Assessment", Technical Report Documentation Page FHWA-CFL/TD-08-006, U.S. Department of Transportation Federal Highway Adminstration, pp. 1-113, (2008).
Roncella, R. et al., "Extraction of Planar Patches from Point Clouds to Retrieve Dip and Dip Direction of Rock Discontinuities", ISPRS WG III/3, III/4, V/3 Workshop, Laser Scanning 2005, Enschede, the Netherlands, pp. 162-167, (2005).
Ferrero, A.M., et al., "Advanced Geostructural Survey Methods Applied to Rock Mass Characterization", Rock Mech. Rock Eng., vol. 42, pp. 631-665, (2009).
Lato, M., et al., "Optimization of LiDAR scanning and processing for automated structural evaluation of discontinuities in rockmasses", Int. J. of Rock Mech. Min. Sci., vol. 46, pp. 194-199, (2009).
Lato, M.J., et al., "Bias Correction for View-limited Lidar Scanning of Rock Outcrops for Structural Characterization", Rock Mech. Rock Eng., vol. 43, pp. 615-628, (2010).
Garcia-Selles, D. et al., "Supervised identification and reconstruction of near-planar geological surfaces from terrestrial laser scanning", Computers and Geosciences, vol. 37, pp. 1584-1594, (2011).
Gigii, G. et al., "Semi-automatic extraction of rock mass structural data from high resolution LIDAR point clouds", Int. J. Rock Mech. Min. Sci., vol. 48, pp. 187-198, (2011).
Lato, M.J., et al., "Automated mapping of rock discontinuities in 3D lidar and photogrammetry models", Int. J. Rock Mech. Min. Sci., vol. 54, pp. 150-158, (2012).
Slob, S., "Automated rock mass characterisation using 3-D terrestrial laser scanning", Ph.D. thesis, Delft, Netherlands, Delft University of Technology, Chapter 4, (2010).
De Agostino, M., et al., "Rock face surveys using a LiDAR MMS", Italian Journal of Remote Sensing, vol. 44(1), pp. 141-151, (2012).
Lato, M, et al., "Engineering monitoring of rockfall hazards along transportation corridors: using mobile terrestrial LiDAR", Natural Hazards and Earth System Sciences, vol. 9, pp. 935-946, (2009).

* cited by examiner

AUTOMATED MOBILE GEOTECHNICAL MAPPING

FIELD

This invention relates generally to the measurement of the orientations of planes in a physical environment. More specifically, this invention relates to apparatus and methods for remote, mobile, automated measurement of the orientations of planes in a physical environment. The invention is particularly suitable for use in mining, civil, and geological applications.

BACKGROUND

A safe, efficient, and accurate method to measure the properties of rock masses is critical in many engineering and geological applications. Such applications include ensuring a stable foundation for civil and geotechnical engineering projects (e.g., constructing highways, buildings, and bridges), building safe and efficient mines (e.g., tunnel excavation, rock wall maintenance), and geological surveys (e.g., mapping to better understand the properties and evolution of geological features). Rock masses have highly anisotropic properties due to the existence of planes of weakness (i.e., discontinuities) caused by tectonic activity, heating and cooling events, or sudden changes in stress. These properties are important because they largely determine the mechanical behaviour, such as stress and displacement, of the rock mass. For example, there may be a reduction of shear strength along a discontinuity, and the tensile strength across a discontinuity is nearly zero. Also, the distribution of discontinuities heavily affects permeability, influencing how fluids flow through a rock mass.

Discontinuities are often visible in rock faces as planar surfaces, whose orientations may be parameterized using axes. The same discontinuity may appear as a set of axes (i.e., a joint set) that have similar orientations. In general, a limited number of joint sets are visible in a rock face, each statistically distributed in orientation and spacing. A joint set has a number of measurable properties from which engineering or geological information can be inferred. These include its orientation, spacing (i.e., perpendicular distance between planes in the same joint set), roughness, and persistence (i.e., the extent of a joint set in a rock mass of a pre-defined volume). Of particular importance in characterizing a rock mass, and perhaps the most commonly measured characteristic, is the orientation of its joint sets, as this indicates the most likely planes of failure. A commonly used geological parameterization of a discontinuity plane is its strike and dip. These two quantities are the azimuth angle of the strike line of the plane (strike), and the angle relative to the plane whose normal is the gravity vector (dip) (see FIG. 1). Although an experienced field geologist or geotechnical engineer can sometimes qualitatively assess the probable mechanical behaviour of a rock mass by studying a rock face, quantitative assessment is necessary for engineering projects or safety considerations.

Measuring the orientations of joint sets can generally be a complex, time-consuming, laborious, and often dangerous endeavour. The most widely used method to measure the strikes and dips of discontinuity planes in a rock face is by manually measuring individual planes with a compass (to measure strike) and an inclinometer (to measure dip). Attempts to automate the process involve scanning a rock face with a stationary 3D light detection and ranging (LiDAR) device and processing the resulting point cloud to estimate the strikes and dips of the discontinuity planes. However, this method has not yet been widely adopted, possibly due to drawbacks such as complexity, time requirements, and high cost.

SUMMARY

According to one aspect of the invention there is provided an apparatus for generating a representation of a physical environment, comprising: a mobile sensor platform (MSP) including sensors that output sensor signals, wherein the sensors sense and/or measure range, gravity, direction of the Earth's magnetic field, and angular velocity, and the MSP is adapted to be moved through the environment; a processor that: (i) receives the sensor signals and generates observations of axes in the environment for a sequence of time steps; (ii) estimates orientation of the MSP for each time of the sequence of time steps, identifies observed axes at each orientation, and associates similar axes; and (iii) links the orientations, the axes in the environment, and the directions of gravity and the Earth's magnetic field, such that each observation is predicted based on the estimates of the orientations, and optimizes an estimate of the orientations; and an output device that outputs the representation of the physical environment based on the optimized orientation estimates.

The apparatus may include an output device that produces an output including one or more of an axis map, a visual representation, and a data set. In one embodiment the output device may produce an output comprising a stereonet.

The MSP may comprise a handheld device, a robotic vehicle, an unmanned aerial vehicle, or a non-robotic vehicle. The sensors may comprise a range sensor i.e., a device that can measure range in three dimensions, such as a flash LiDAR, a scanner, or a camera; which may also be referred to as a 3D distance sensor), a three-axis accelerometer, a three-axis gyroscope, and a three-axis magnetometer.

The physical environment may comprise a rock face or a man-made structure.

According to another aspect there is provided programmed media for use with a computer, the programmed media comprising a computer program stored on non-transitory storage media compatible with the computer, the computer program containing instructions to direct the computer to perform one or more of: receive at least one sensor signal from at least one sensor associated with a MSP; process the one or more sensor signals and generate observations of axes in an environment for a sequence of time steps; estimate orientation of the MSP for each time of the sequence of time steps, identify observed axes at each orientation, and associate similar axes; link the orientations, the axes in the environment, and the directions of gravity and the Earth's magnetic field, such that each observation is predicted based on the estimates of the orientations, and optimize an estimate of the orientations; and output a representation of the optimized orientation estimates. In one embodiment the output comprises an axis map.

Another aspect relates to programmed media for use with a computer, the programmed media comprising a computer program stored on non-transitory storage media compatible with the computer, the computer program containing instructions to direct the computer to perform one or more of: receive data corresponding to observations of axes in an environment for a sequence of time steps and estimates of orientation of a MSP for each time of the sequence of time steps; identify observed axes at each orientation, and associate similar axes; link the orientations, the axes in the environment, and the directions of gravity and the Earth's magnetic field, such that each observation is predicted based on the estimates of the orientations, and optimize an estimate of the orientations; and output a representation of the optimized orientation estimates. In one embodiment the output comprises an axis map.

Another aspect relates to a method for generating an axis map of a physical environment, comprising: using a mobile sensor platform (MSP) including sensors that output sensor signals, wherein the sensors sense and/or measure range, gravity, direction of the Earth's magnetic field, and angular velocity, and the MSP is adapted to be moved through the environment; using a processor to: (i) receive the sensor signals and generate observations of axes in the environment for a sequence of time steps; (ii) estimate orientation of the MSP for each time of the sequence of time steps, identify observed axes at each orientation, and associate similar axes; and (iii) link the orientations, the axes in the environment, and the directions of gravity and the Earth's magnetic field, such that each observation is predicted based on the estimates of the orientations, and optimize an estimate of the orientations; and output a representation of the optimized orientation estimates.

In one embodiment the method comprises producing an output including one or more of an axis map, a visual representation, and a data set. In one embodiment the method comprises producing a stereonet.

In one embodiment the method comprises moving the MSP through the environment so that axes to be mapped are captured by a field of view of the range sensor, wherein the physical environment comprises a rock face.

BRIEF DESCRIPTION OF THE DRAWINGS

For a greater understanding of the invention, and to show more clearly how it may be carried into effect, embodiments will be described, by way of example, with reference to the accompanying drawings, wherein.

DETAILED DESCRIPTION OF EMBODIMENTS

Described herein are apparatus and methods for obtaining data corresponding to the axes of planar surfaces (i.e., the orientation of planes) in a physical environment. The data may be referred to as an axis map. The data may be provided as a graphical representation, such as in a stereonet. Typically the environment includes exposed rock. However, embodiments as described herein are not limited thereto, and may be applied to any environment where such data is required.

For the purpose of this disclosure, embodiments will be described as applied to measuring the orientations of joint sets in a rock mass. Such embodiments address weaknesses of current manual and remote sensing approaches. Moreover, the embodiments provide mobile measuring of joint sets to efficiently and probabilistically provide a hands-off approach to rock mass characterization. One embodiment considers the orientations of discontinuity planes in a rock face as features in a map, and uses a MSP equipped with 3D LiDAR to identify the joint sets in a rock mass.

As used herein, the term "rock mass" refers to a volume of rock embedded in the earth.

As used herein, the term "rock face" refers to an exposed portion of a rock mass.

As used herein, the term "axis map" refers to a representation of the axes that define the orientations of planes in the physical environment.

Stereonets

Figure 1:
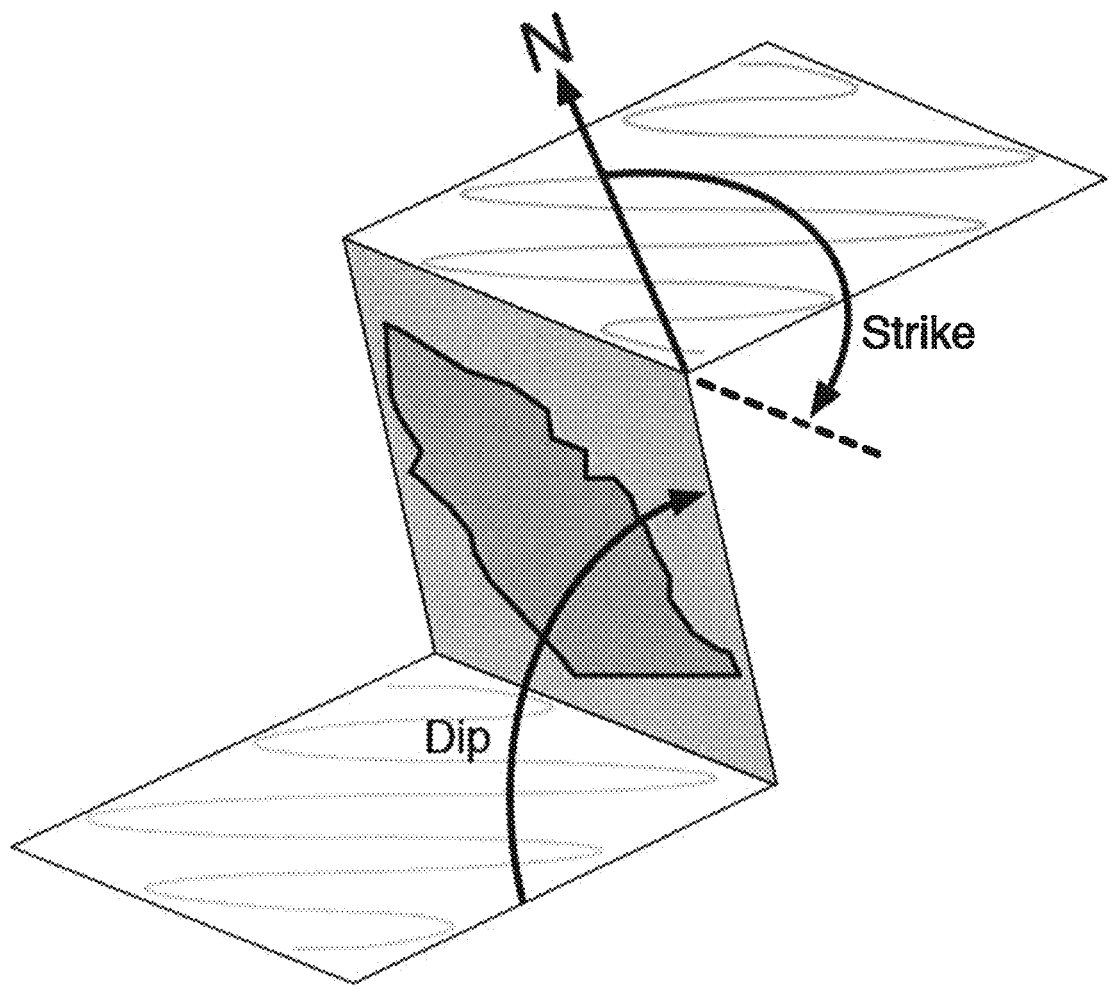
FIG. 1 is an illustration showing the strike and dip angles of a plane in a rock mass, wherein the strike is the azimuth (compass) angle measured from the strike line (shown as a dashed line) of the plane, and the dip is the angle relative to the horizontal.

The orientation of a discontinuity plane is characterized by the azimuth angle of the strike line of the plane (strike), and the angle relative to the plane whose normal is the gravity vector (dip), as shown in FIG. 1. Although the strike is sometimes described by cardinal directions (e.g., N30° E), this disclosure uses the azimuth angle, which is three-digit scalar measured clockwise from true North with the degree symbol omitted (e.g., N30° E=030). The dip is taken as the smallest angle from the horizontal; therefore, it is always between 0° and 90°, and is also expressed without the degree symbol. As a result, the orientation of a discontinuity plane is fully described by "strike/dip" (e.g., 034/77, 325/19).

Figure 2A:
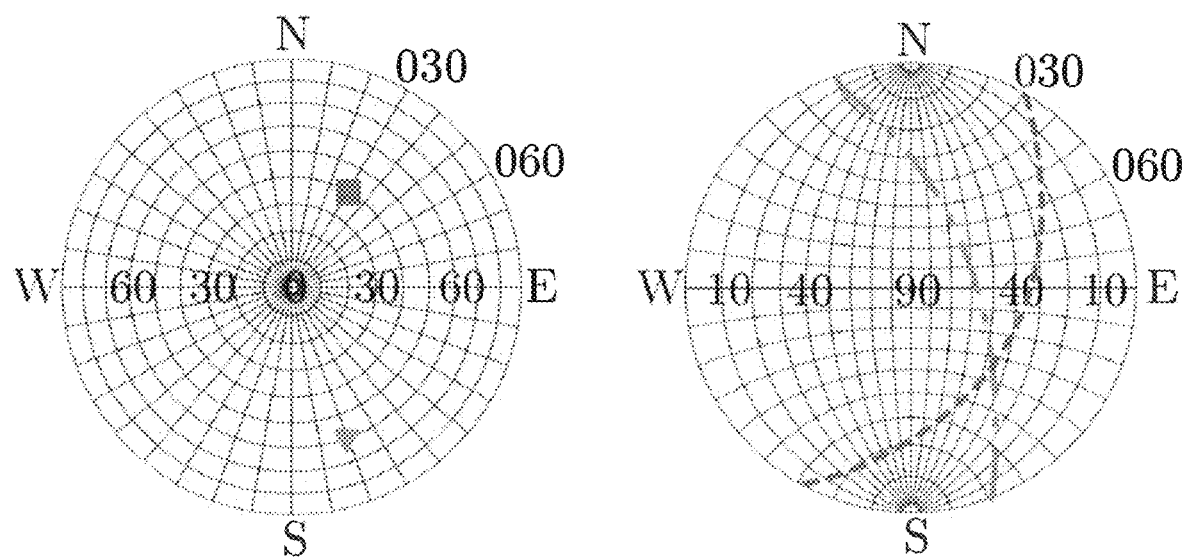
FIG. 2A is a diagram showing two types of stereonets: a polar projection (left), and an equal area (Wulff) projection (right), wherein a plane with orientation 030/40 is plotted as a square and a dashed line on the polar and equal area projections, respectively, and a plane with orientation 160/60 is plotted as a triangle and a dash-dotted line, according to an example.

One common method for visualizing strike and dip measurements is a stereonet (i.e., a stereographic projection on which the orientation or direction of geological features is plotted). There are several different projections possible when using stereonets. For example, two types of stereonets are illustrated in FIG. 2A: a polar projection (left), and an equal angle (Wulff) projection (right). Both projections represent strike as the angle around the circular plot, with North (000), East (090), South (180), and West (270). The polar projection is a graph in polar coordinates, where the radius is the dip and the angle is the strike; therefore, a plane is represented as a point (or pole). A plane with orientation 030/40 is plotted as a square and a dashed line on the polar and equal area projections, respectively. Similarly, a plane with orientation 160/60 is plotted as a triangle and a dash-dotted line. In the Wulff projection, the angle between the sectors in the grid are preserved. A plane is plotted by tracing the great circle of the dip and rotating it so that its origin begins at the strike angle.

Figure 2B:
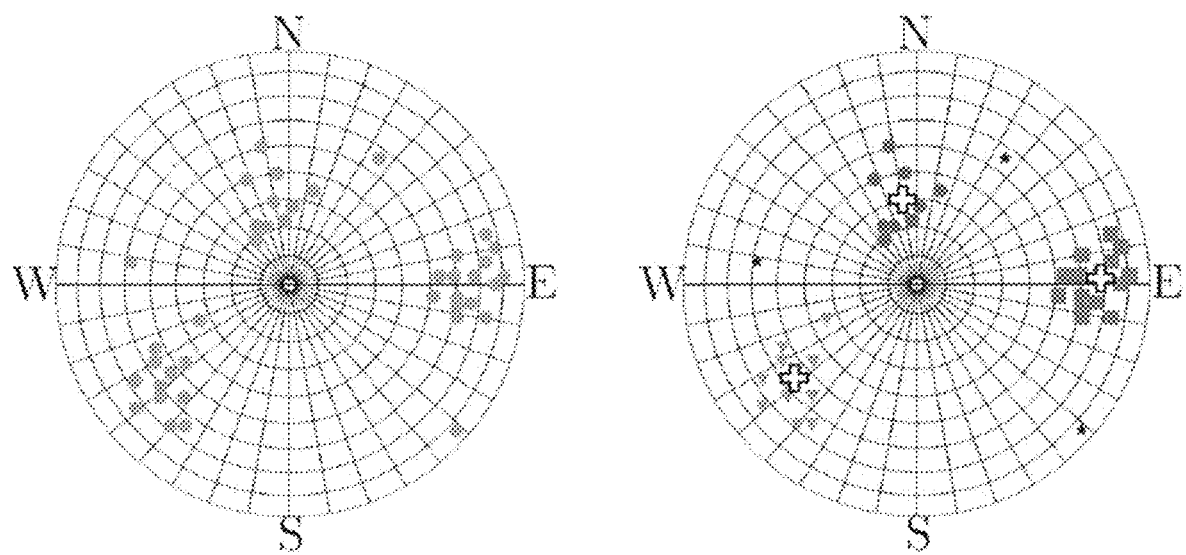
FIG. 2B is a diagram showing three different joint sets plotted on a polar stereonet prior to clustering (left) after clustering (right), wherein outliers that were removed prior to clustering are represented by stars; according to an example.

Discontinuity planes tend to occur in a small number of joint sets. The correlations among the planes become evident when plotted on a stereonet, for example, as planes belonging to the same joint set tend to form clusters. Clustering algorithms (e.g., k-means, density-based spatial clustering of applications with noise (DBSCAN)) are then used to determine the joint set membership of individual planes. From these clusters, the mean strike and dip angles are extracted to represent the orientation of the joint set. This is illustrated in FIG. 2B, which shows three different joint sets plotted on a polar stereonet prior to clustering (left) and after clustering (right). This step may also include the rejection of outliers (represented by stars) using either manual or statistical methods. Planes (or axes) belonging to the same joint set tend to appear as clusters of points in polar stereonets. From these clusters, the mean strike and dip of each set can be calculated (shown as a cross in each cluster). Note the uncertainty of each plane is not usually calculated; therefore, each plane is weighted equally in mean calculations.

Strike and dip measurements are traditionally performed manually with a compass and an inclinometer or similar tool(s) such as a Brunton compass. Hand measurements offer a fast, portable, and inexpensive means of measuring strike and dip of individual planes, but have disadvantages when a robust data set is required for quantitative analysis, including procedural errors (e.g., improper use or interpretation of the tool), or sampling errors (e.g., magnetic interference);

under-sampling (i.e., not taking enough measurements or a proper distribution of measurements to ensure that the stereonet properly represents the rock face);

bias (e.g., choosing only planes that are easier to measure, favouring one joint set over another);

ensuring adequate coverage of a rock face can be laborious and time consuming;

measuring inaccessible areas is difficult (e.g., the requirement of scaffolding or rock-climbing equipment to measure tall rock faces);

safety concerns (e.g., unstable rock faces, areas where engineering projects such as quarrying, tunneling, or mining are in progress).

Despite these disadvantages, measuring strike and dip by hand is widely practiced and is by far the most common method used to produce stereonets for quantitative analysis.

Using remote sensing methods to measure the orientation of joint sets is a relatively new and currently active field of research. Such methods extract the discontinuity planes in a rock face by processing 3D point clouds. The point clouds can be obtained by photogrammetry (extracting 3D information from multiple camera views) or by 3D LiDAR. Although photogrammetry can provide additional information about a target (e.g., colour), 3D LiDAR directly and usually provides a more accurate point cloud (i.e., no additional error is introduced in combining information from multiple sensors). In general, most approaches to date follow a similar sequence of steps that are summarized below.

Remote sensing has a number of advantages over hand measurements. A much larger number of planes can be measured with much less effort, including many that may be inaccessible by hand. Bias is reduced as the planes being measured are not manually selected (unless, of course, this is done during plane segmentation). As the operator does not need to interact directly with the rock face, it is generally much safer. However, there remains some disadvantages when using remote sensing, including:

high cost of high-resolution 3D LiDAR;

the size and weight of the sensor far exceeds that of traditional hand tools;

capturing the data required for proper joint orientation analysis can still be laborious and time consuming due to time and effort required for surveying and scanning;

occlusions in the data due to the orientation of planes relative to the orientation of the sensor (in the worst case, an entire joint set could be missed);

the advantages of remotely capturing large areas of data are restricted in closed-in areas such as underground mines;

most "off-the-shelf" software used to process the point clouds is proprietary and expensive.

In general, the advantages of remote sensing are impeded by its high cost, non-portability, and that it must be stationary.

Mobile Sensing Platform (MSP)

Described herein are mobile sensing platform (MSP) embodiments for efficiently and accurately measuring the orientation of joint sets in rock masses. The embodiments provide the advantages of remote sensing, while overcoming many of its disadvantages. For example, like remote sensing, MSP embodiments measure a large number of planes without bias or physical labour. Relative to manual and remote sensing techniques, the embodiments provide measurements in less time and are less expensive, more flexible to different environments, more portable, and extendable to different platforms and sensors.

The MSP platform does not rely on any particular method of data collection, type of sensor, or type of vehicle for mobility. In general, an MSP has the capability to gather 3D point clouds of a rock face, and to measure its own motion (i.e., its change in orientation as it moves). For example, mobility of the MSP may be achieved through a hand-held embodiment, an embodiment affixed to or used with any type of vehicle (e.g., for one or more of underwater, water surface, snow, land (underground and/or surface), air, and space travel), such vehicle being operated by a human (on board or remotely, such as a robotic vehicle or unmanned aerial vehicle (UAV)) or operated partially or fully autonomously. Embodiments will be described herein primarily with respect to certain sensors; however, it will be appreciated that the invention is not limited thereto as other types of sensors may be employed insofar as minimum requirements for resolution and accuracy of the point cloud are provided. For example, excellent performance is obtained in an embodiment where a relatively inexpensive 3D LiDAR is employed.

The most challenging aspect of measuring strike and dip using a MSP is addressing uncertainty in sensor orientation during observations of the rock face. In the case of a stationary sensor, the position of the sensor is surveyed such that its orientation is known at the time of measurement; the uncertainty in its orientation is usually considered negligible and ignored. This is not the case in an MSP when the sensor is constantly moving.

Although the initial orientation of an MSP might be measured accurately, subsequent orientations of the MSP will depend on its sensors. The sensors produce sensor signals that typically contain "noise" which must be filtered or otherwise managed to extract data. Additionally, a feature of the MSP is that it is not required to be stationary during the actual creation of point clouds. To address the problem of using potentially noisy sensor signals to infer geometrical information about the environment (i.e., a map) while also determining the state of the platform itself (i.e., localization), a batch state estimation may be used. Here, the map is the orientation of joint sets on a targeted rock face, and the state of the platform is its orientation. Note that because only the orientation of the map is of interest, only the orientation of the platform is necessary to construct the map (i.e., the position of the platform is irrelevant). In this disclosure, measuring strike and dip using batch state estimation will be referred to as "axis mapping".

It is expected that MSP embodiments as described herein, which may employ axis mapping, may be used to generate stereonets of rock faces of at least comparable accuracy to those derived from hand measurements and stationary remote sensing, and therefore useful for the same types of quantitative analysis. It is noted that a direct comparison of hand-derived stereonets and MSP stereonets is not a measure of accuracy, as the hand-derived stereonets are subject to the errors described above. Further, collecting data from a rock face using a MSP is less time-consuming and laborious than both hand measurements and stationary remote sensing. As a result, a MSP is a viable alternative to other methods.

It is noted that axis mapping may remain completely independent of the MSP from which data is collected. Axis mapping embodiments may be made generic and non-reliant on particular sensors or vehicles, and have minimum requirements regarding the quality of the point cloud and how motion sensing measurements should be derived. In addition to being a convenient tool for geological applications, axis mapping may a useful contribution to the robotics community at least because of its approach to the unique orientation-only batch estimation problem.

In a stationary remote sensing approach, a large all-encompassing point cloud of a rock face is built and a plane extraction technique is used to calculate the orientation of the joint sets. However, that approach does not consider the special properties of the problem being solved; specifically, the fact that only orientations of planes are important. As a result, much of the information in a point cloud, such as the points themselves and the geometrical location of the extracted planes, can be discarded. The core axis mapping algorithm is designed around this minimal representation. The algorithm receives noisy observations of normal vectors as input, not the point clouds themselves. Therefore, the types of point clouds and the plane segmentation methods are kept separate from the core algorithm. The core algorithm is agnostic to the sensors themselves; it is only required that processed outputs of the sensors (inputs to the algorithm) can be used to build a graph of observations used tier batch state estimation. This architecture allows for a unique, "orientation-only" state estimation algorithm that deals solely with directions and orientations and dismisses positional information. To date, no such implementation is known to exist.

Generating the Axis Map from the Optimized State

Figure 3:
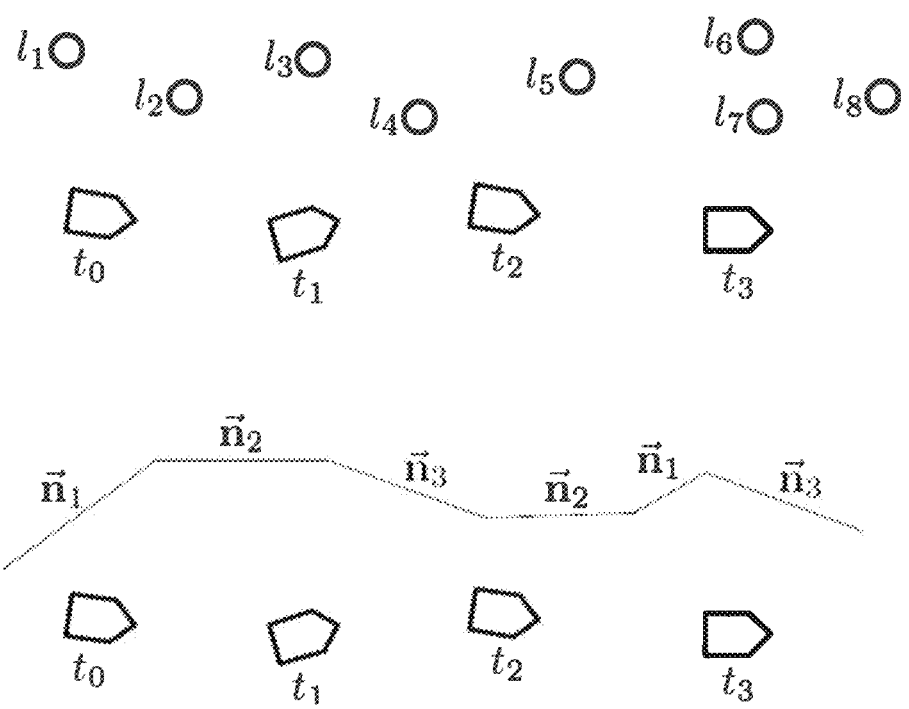
FIG. 3 is a 2D illustration showing a difference between conventional landmark-based state estimation (top) and axis mapping (bottom), according to one embodiment.

There are two major differences between axis mapping as described herein and conventional state estimation algorithms. Firstly, the map in axis mapping consists of the orientations of planes (described below), which is not a vector space. As a result, operations on the map that are necessary when performing mapping (e.g., perturbations, coordinate transformations, means, etc.) must be explicitly defined to prevent violations of their topological space. Next, the physical environment being observed has multiple instances of the same feature in the map. All discontinuity planes in a rock face with (nearly) the same orientation are part of the same joint set. That is, there is no distinction between observing two different discontinuity planes if they belong to the same joint set. The joint set itself is the feature in the map, not the individual planes. This is a fundamental difference between axis mapping and conventional state estimation algorithms, as it affects how the problem must be formulated. This difference is illustrated in FIG. 3, which shows that in landmark-based mapping (top), each landmark is unique; there is a one-to-one mapping between map entries and landmarks in the environment. In axis mapping (bottom), map entries exist in multiple locations in the environment. Also, due to the natural variations of rock faces, the orientation of planes belonging to the same joint set vary. That is, the lines marked by $\vec{n}_1$ in this 2D illustration belong to the same joint set but are not oriented identically. Additionally, there are natural variations in the orientation of individual discontinuity planes in a joint set. Therefore, the "true" orientation of a joint set is a distribution, which must be considered when attempting to associate a newly observed discontinuity plane with a joint set.

The Axis Mapping State

The axis mapping state consists of orientations and axes. Many different parameterizations of rotations exist; however, it is well known that all minimal parameterizations (i.e., the number of parameters is equal to the number of degrees of freedom) have at least one singularity. The set of all axes form the unit sphere $S^2$. An axis is the unordered pair of directions diametrically opposed the unit sphere, or equivalently, a single point on the unit hemisphere. Like rotations, minimal parameterizations of axes have at least one singularity.

Figure 4:
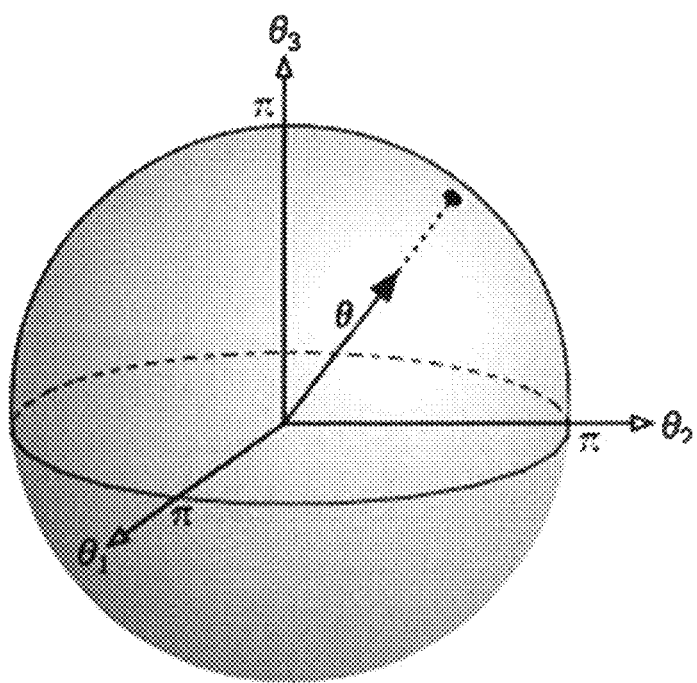
FIG. 4 is an illustration of a rotation vector θ, according to an embodiment.

Axis mapping parameterizes rotations as both unit quaternions (global parameterization) and rotation vectors (local, vector-like parameterization). FIG. 4 is an illustration of a rotation vector θ. Geometrically, rotation vector space is a ball of radius π. The length of the rotation vector represents the angle of rotation θ, and its direction corresponds to the axis of rotation a. The projection of the rotation vector to the surface of the ball is shown to help visualize the space as a solid ball. The rotation vector $\theta = [\theta_1\ \theta_2\ \theta_3]^T$ is parameterized by its three scalar components in this space. The rotation vector is "pseudo vector space" that is required to perform state estimation.

Figure 5A:
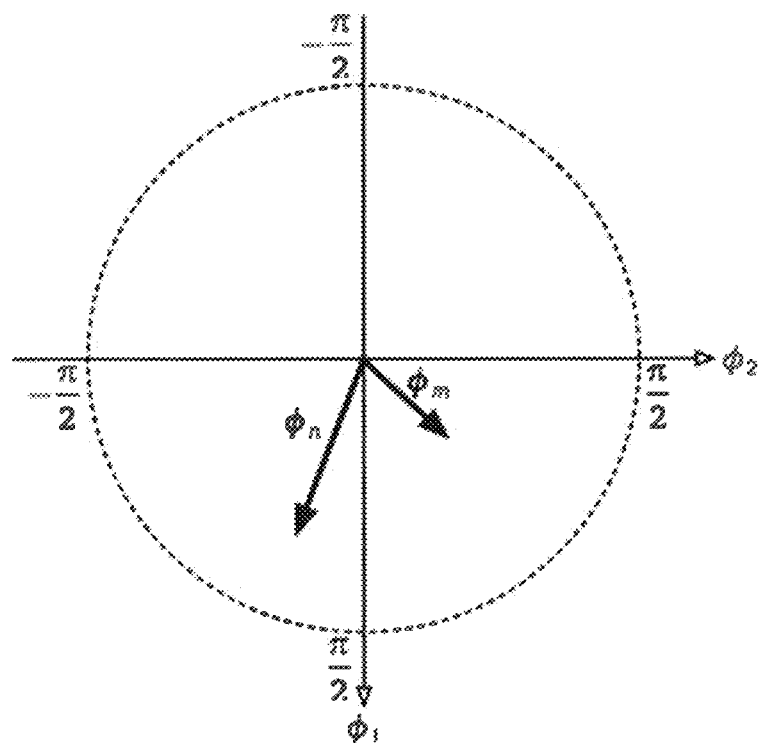
FIG. 5A is a diagram showing global parameterization, according to an axis mapping embodiment.
Figure 5B:
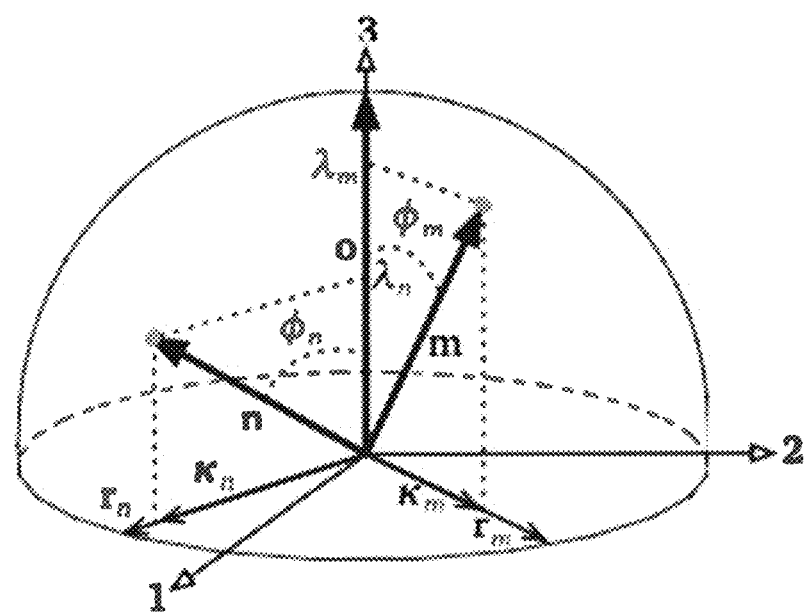
FIG. 5B is an illustration showing axis vector parameterizations of the unit axes in FIG. 5A, according to an embodiment.
Figure 6A:
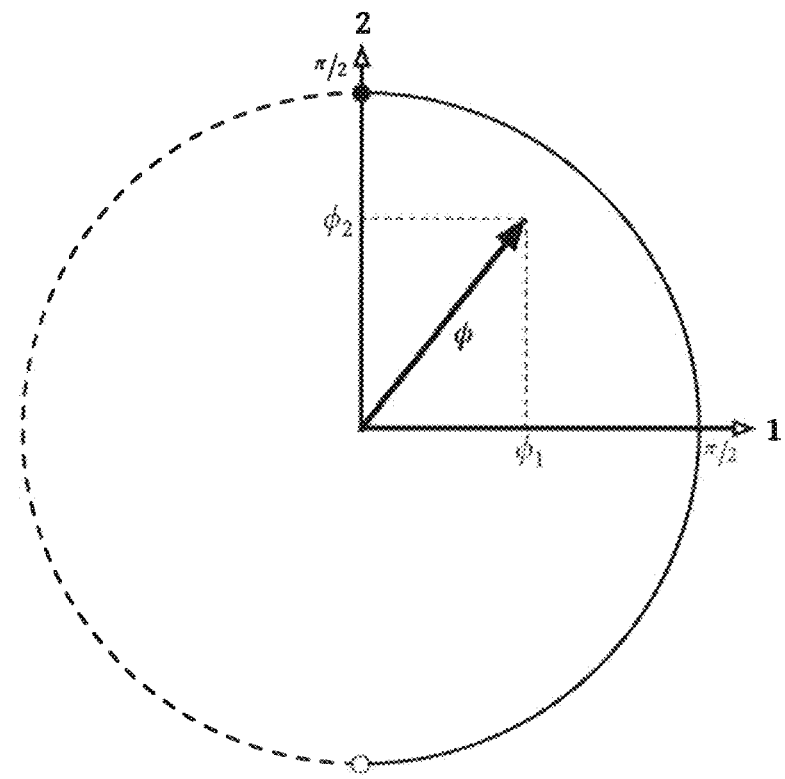
FIG. 6A is an illustration showing axis vector parameterization, according to an embodiment.
Figure 6B:
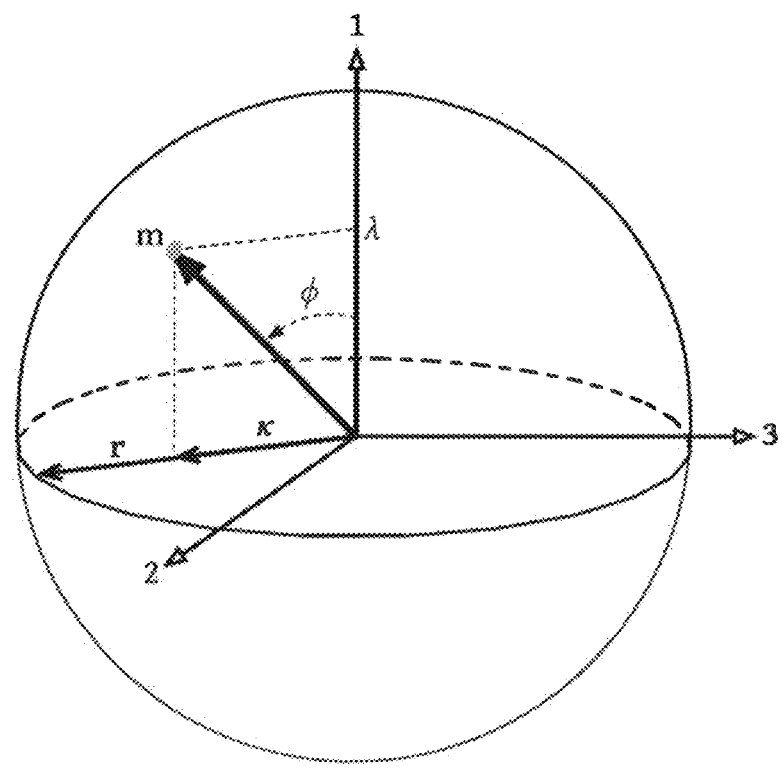
FIG. 6B is a diagram showing unit axis parameterization, according to an embodiment.

Axes are parameterized as both unit axes (global parameterization) and axis vectors (local, vector-like parameterization). According to one embodiment, global parameterization (FIG. 5A) is used to represent axes that are free of singularities and is defined for all axes. When axes are compared and subtracted from each other, this is done using unit axes and the difference is converted into an axis vector (see FIG. 5B). Axis vector parameterization according to another embodiment is shown in FIG. 6A, and FIG. 6B shows the unit axis parameterization. The projection of the unit axis onto the plane of the hemisphere is the vector part κ, and its component along the axis of the hemisphere (3) is the scalar part λ. The angle φ between the axis of the hemisphere and the unit axis, and the normalized vector part r, form the axis-angle parameterization of an axis, and their product φ:=φr form the axis vector parameterization. The identity unit axis o is the unit axis along the axis of the hemisphere.

Unit quaternions and unit axes are global parameterizations of their respective spaces because they vary continuously for continuous changes in the states they represent. Rotation vectors and axis vectors are local parameterizations because they only vary continuously for continuous local changes from a reference state. Put differently, given a reference rotation or axis, not all rotations and axes relative to the reference are well-defined by local parameterizations due to singularities. Axis mapping alternates between these two parameterizations: the state is represented by a global parameterization, while the state estimation algorithm calculates local perturbations to the state with the local parameterization. Because state perturbations and observation errors tend to be local, the issues associated with the local parameterization are avoided.

FIG. 6A is an illustration of the axis vector parameterizations. Axis vectors are one of the two parameterizations of axes used in axis mapping (the other being unit axes (FIG. 6B)). The axis vector is a "pseudo vector space" that is required to perform state estimation. Geometrically, axis vector space is a flattening of the unit hemisphere to a disc of radius π/2. The axis vector φ has length φ in the direction r. It is parameterized by its two scalar components φ=[φ$_1$ φ$_2$]$^T$ in this space.

Figure 7:
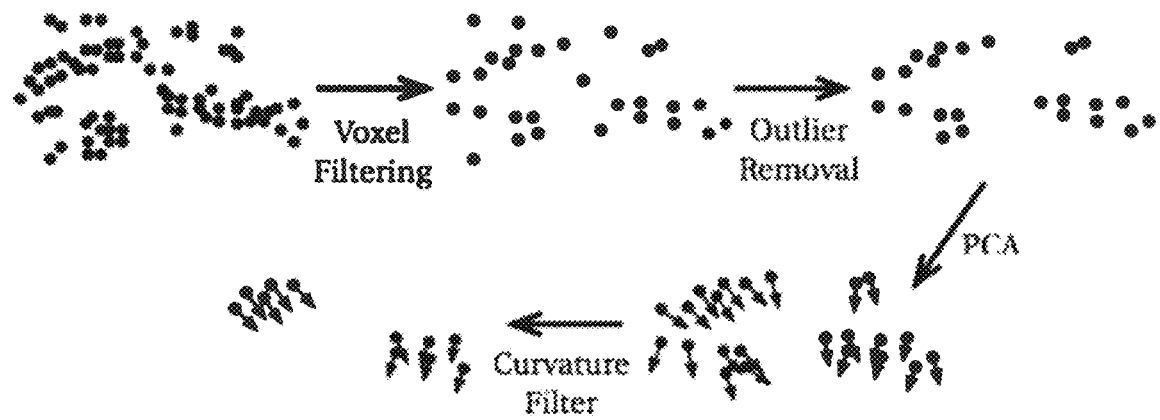
FIG. 7 is a visualization of how axis extraction is performed in axis mapping, according to one embodiment.

FIG. 7 is a visualization of how axis extraction is performed in axis mapping. This describes how a point cloud is transformed into a list of axis observations. First, a voxel filter reduces the number of points in the point clouds. Next, outliers are removed based on the mean distance to their neighbouring points. Next, a robust variant of principal component analysis (PCA) is used to estimate the normal vector to surface being measured. Finally, the curvature of the surface being measured is estimated, and points with larger curvatures are discarded.

Data Collection and Observations

The MSP is equipped with sensors that sense/measure distance, gravity, the direction of the Earth's magnetic field, and angular velocity. For example, the sensors may comprise a 3D range sensor (e.g., a LiDAR), a three-axis accelerometer, three-axis gyroscope, and three-axis magnetometer. Data is collected by moving the MSP through a trajectory in the test environment. The trajectory is selected to ensure that most or all of the flat surfaces of interest are scanned by the range sensor. The orientation of the MSP is estimated at discrete moments of the trajectory. At each orientation, the sensor suite on the MSP observes the direction of gravity (using the accelerometers), the direction of the Earth's magnetic field (using the magnetometers), and/or the axes of flat surfaces in the environment (using the range sensor). Additionally, the rotation of the MSP between sequential orientations is also observed (using the gyroscopes).

Each type of observation is predicted based on the current estimate of the orientation of the MSP and an observation model. These predictions are compared against the actual sensor observations and the difference between them is the error of the observation. Axis mapping determines the optimal sequence of orientations of the MSP that minimizes these errors.

Associating Axes Observed at Different Orientations

The axes extracted from measurements by the 3D range sensor are all expressed in the coordinate frame of the sensor. To associate observations from different observations, the axes are first transformed to a common shared frame. Using the initial estimate of the sequence of orientations of the MSP, all the axis observations are transformed to the global coordinate frame. At this point, similar observations are clustered together and marked as observations of the same planar surface in the environment.

Optimizing the Axis Mapping State

The negative log-likelihood of an observation is its squared error (with respect to its prediction) proportional to the inverse of its covariance matrix (i.e., its uncertainty). The goal of axis mapping is to determine the optimal estimate of the state that minimizes the negative log-likelihood of all observations simultaneously. The sum of all the negative log-likelihoods is calculated using a cost function. The state is optimized by iteratively solving for the optimal perturbation of the state estimate that minimizes the linearized cost function. See, for example, FIG. 8. It is necessary to linearize the cost function because the observation models are all nonlinear. Also, because the observations and the state are not part of a vector-space (e.g., rotations and axes cannot be treated as vectors), the optimal perturbation is applied by first converting it to its global parameterization. Additionally, linearizing the cost function must also consider the spaces in which the observations reside. The actual calculation of the optimal perturbation is determined using a nonlinear least-squares algorithm.

Figure 8:
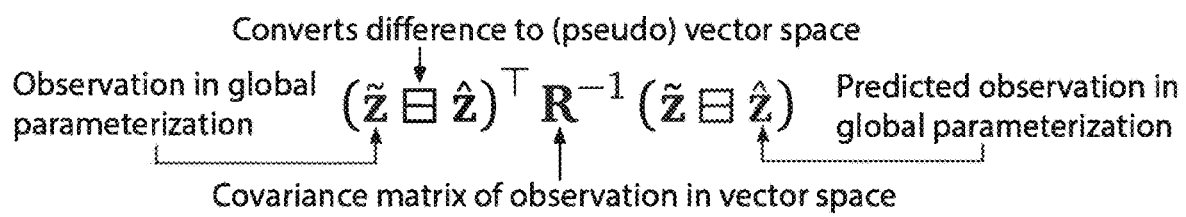
FIG. 8 shows an equation representing the negative log-likelihood of a single observation, according to an axis mapping embodiment.

For example, FIG. 8 shows an equation representing the negative log-likelihood of a single observation. The optimization function minimizes the sum of the negative log-likelihood of all the observations simultaneously. That is, the result of the equation is calculated for every observation (i.e., every measurement of the direction of gravity, the earth's magnetic field, rotations between orientations, and axes extracted from point clouds), and the results are summed to get the total cost of all the observation errors. An optimization algorithm then determines the best way to change (i.e., perturb) the state (i.e., the estimated sequence of orientations) such that the total cost is as small as possible.

Generating the Axis Map from the Optimized State

The optimized state contains the best estimate of the orientation of the MSP at a sequence of steps along its trajectory. At each of these orientations, a number of axes were extracted from a measurement of the 3D range sensor. Using the orientation from which the measurement was made, each axis is rotated into the global coordinate frame. This rotation is performed using the quaternion rotation operator, which performs a rigid transformation of the axis. The resulting axis map can be visualized as a stereonet if required by converting each axis to a strike and dip parameterization.

Media

Embodiments may comprise programmed media for use with a computer, the programmed media comprising a computer program stored on non-transitory storage media compatible with the computer, the computer program containing instructions to direct the computer to perform one or more of: receive at least one sensor signal from at least one sensor associated with a MSP; process the one or more sensor signals and generate observations of axes in the environment for a sequence of time steps; estimate orientation of the MSP for each time of the sequence of time steps, identify observed axes at each orientation, and associate similar axes; link the orientations, the axes in the environment, and the directions of gravity and the Earth's magnetic field, such that each observation is predicted based on the estimates of the orientations, and optimize an estimate of the orientations; and output an axis map from the optimized orientation estimates.

In one embodiment the programmed media directs the computer to receive sensor signals from sensors comprising a range sensor, a three-axis accelerometer, a three-axis gyroscope, and a three-axis magnetometer.

In another embodiment the programmed media directs the computer to receive data corresponding to observations of axes in the environment for a sequence of time steps and estimates of orientation of the MSP for each time of the sequence of time steps; identify observed axes at each orientation, and associate similar axes; link the orientations, the axes in the environment, and the directions of gravity and the Earth's magnetic field, such that each observation is predicted based on the estimates of the orientations, and optimize an estimate of the orientations; and output a stereonet from the optimized orientation estimates.

Embodiments are further described by way of the following non-limiting Examples.

Example 1

This example describes a generalized MSP including an algorithm that may be used to obtain an axis map (i.e., a list of dominant planar axes) in an environment, and generate a representative output, such as an axis map (e.g., a stereonet). Typically the environment is a rock face, although the embodiment may be applied to other environments. As noted above, the MSP may be a handheld wand/device, a mobile robot, a UAV, or other robotic or non-robotic platform.

Figure 9:
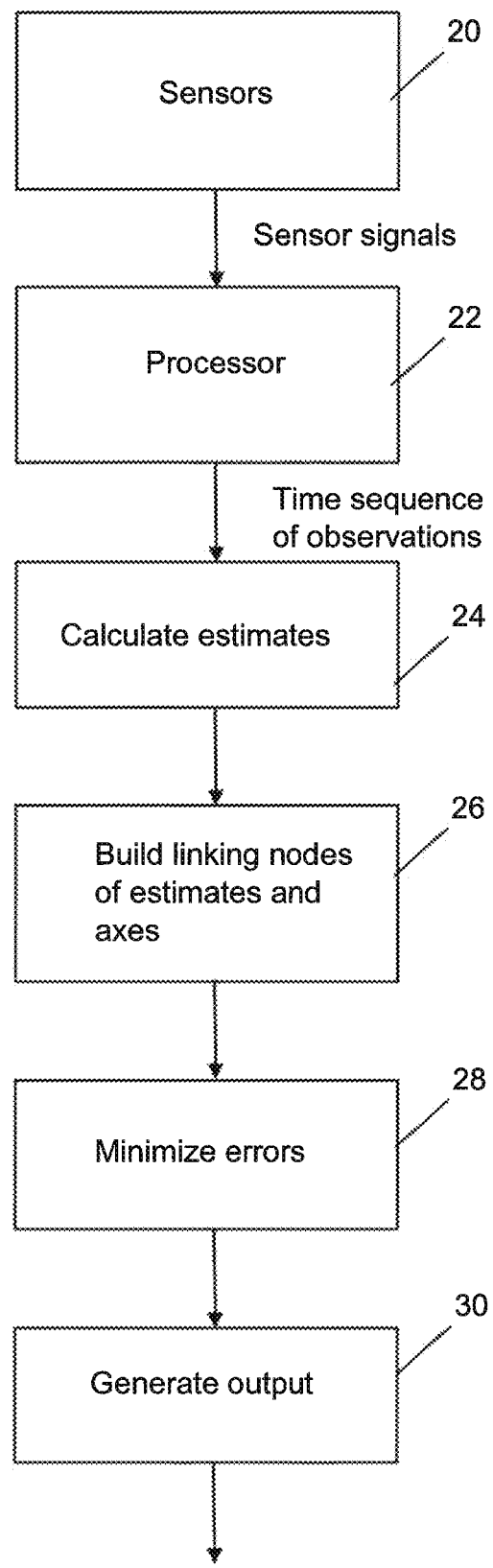
FIG. 9 is a high-level block diagram showing major components and functions of an MSP with axis mapping and stereonet generation, according to one embodiment.
Figure 10:
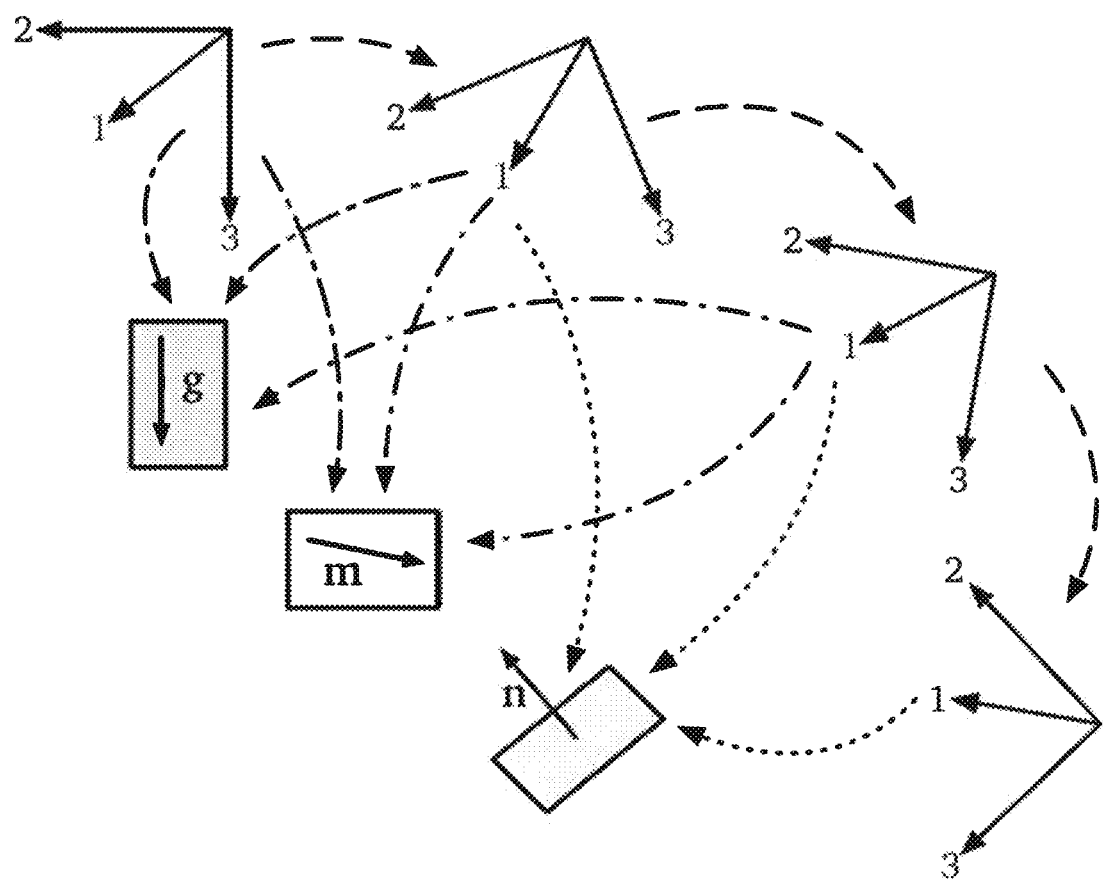
FIG. 10 is a diagram showing a sequence of orientations estimated by observing rotations between sequential orientations, directions (gravity and the Earth's magnetic field), and axes (planar surfaces in the environment)

Referring to FIG. 9, the MSP is equipped with sensors 20 that sense/measure distance, gravity, the direction of the Earth's magnetic field, and angular velocity. For example, the sensors may include a range sensor, a three-axis accelerometer, a three-axis gyroscope, and a three-axis magnetometer. The MSP is moved through the environment in such a way that all planes to be mapped are captured by the field of view of the range sensor. The data from all the sensors is then processed 22 to produce a time sequence of observations. An initial estimate of the orientation of the MSP is calculated 24 for the sequence of time steps and the observed axes at each orientation are associated with each other. For example, a most likely sequence of orientations, e.g., depicted as the coordinate frames in FIG. 10, may be estimated by observing rotations between sequential orientations, directions (gravity and the Earth's magnetic field), and axes (planar surfaces in the environment). Linking nodes (e.g., a graph) is built 26 linking the estimated orientations, the axes in the environment, and the directions of gravity and the Earth's magnetic field. Each observation (an edge in the graph) is predicted based on the initial estimates of the orientations, and errors between the predictions and the observations are minimized 28, producing an optimal estimate of the orientations. An output, such as a stereonet, is generated 30 by transforming the observed axes to the global coordinate frame using the optimized orientation estimates.

Example 2

Figure 11:
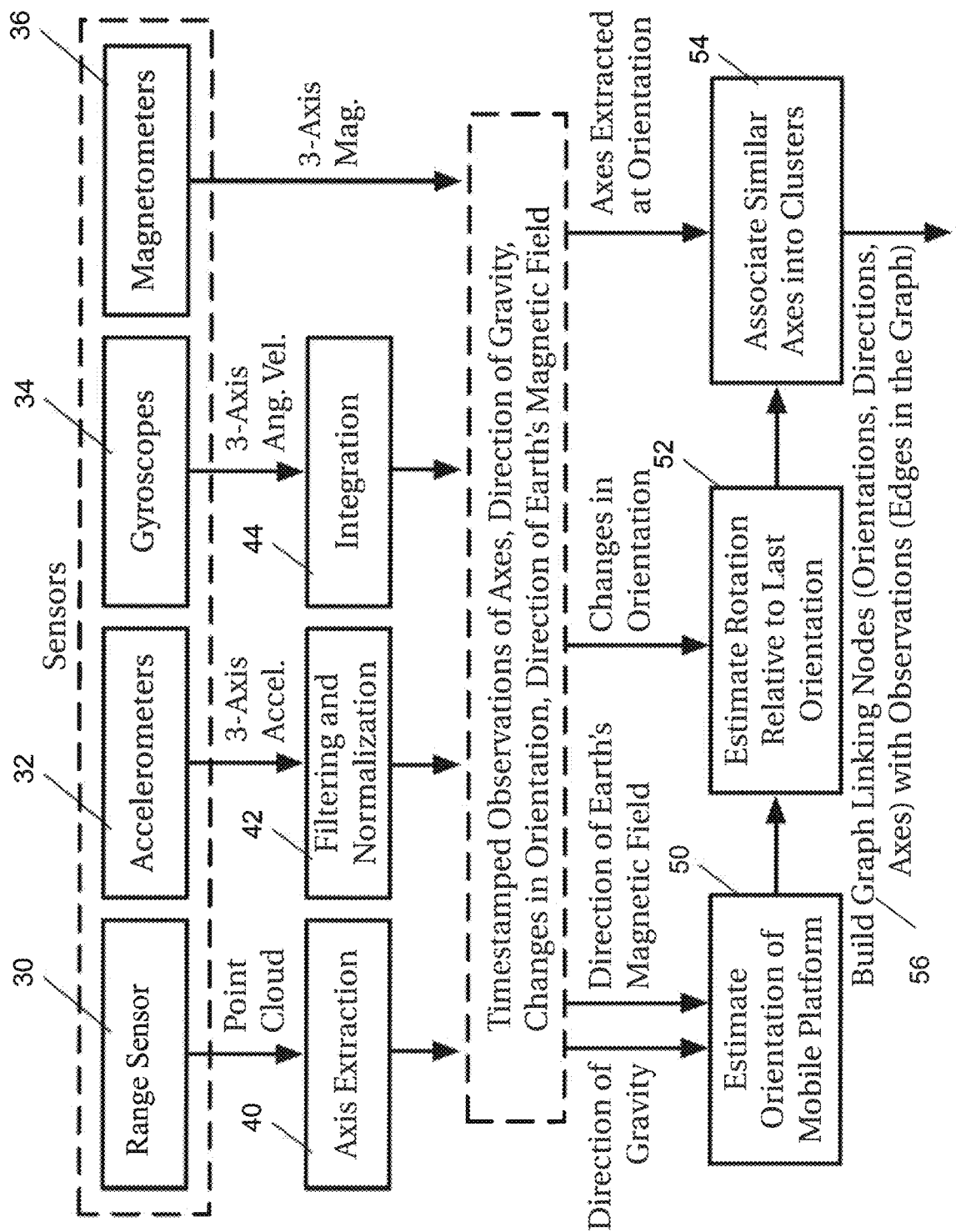
FIG. 11 is a block diagram showing components and functions of a MSP with axis mapping and stereonet generation, according to one embodiment.
Figure 11:
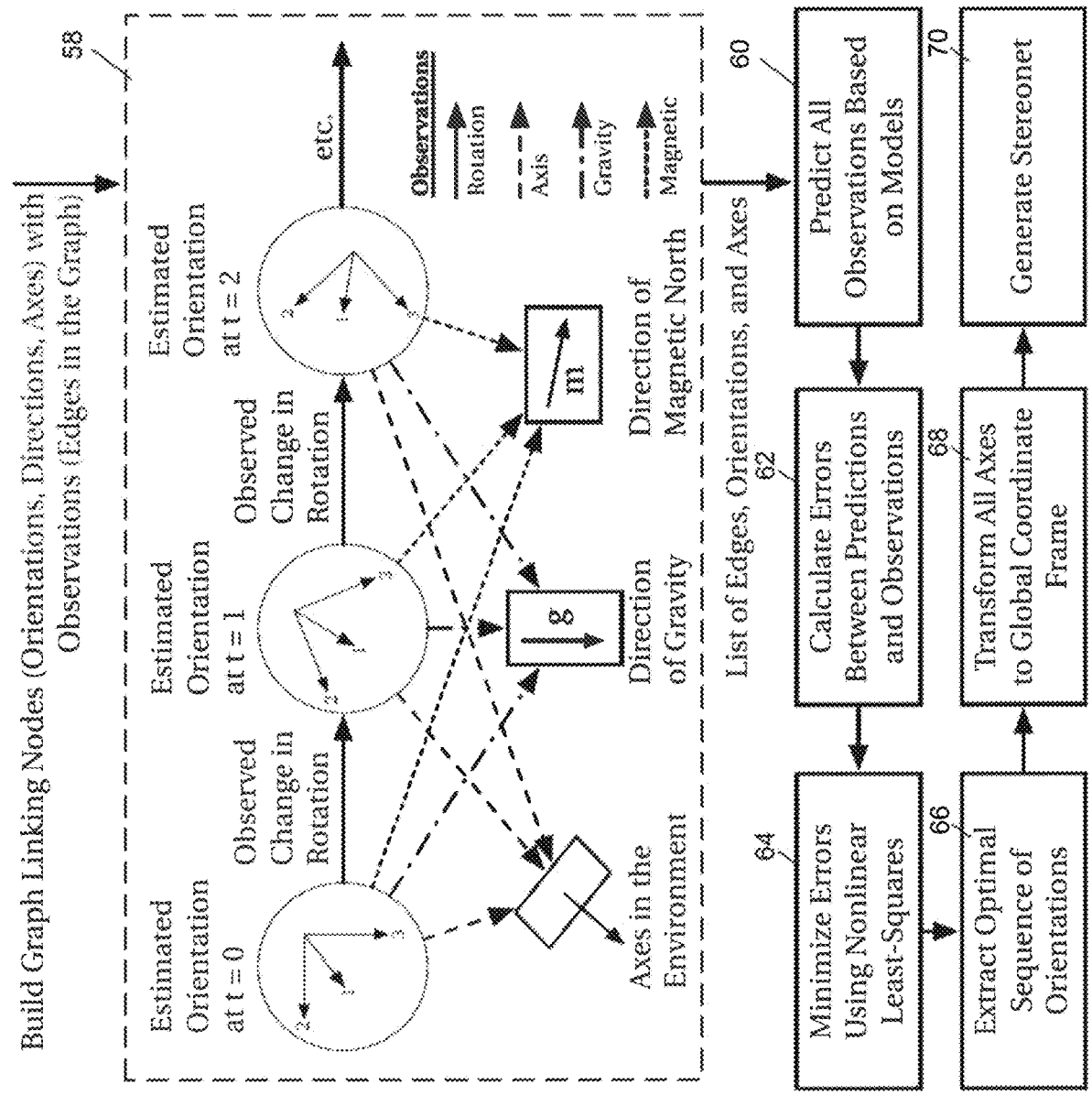

This example describes a more detailed embodiment based on the generalized embodiment of Example 1. The features described herein, with reference to FIG. 11, may be included in a MSP and may be used to obtain an axis map in an environment such as a rock face, and generate an output such as a stereonet.

(i) The MSP is equipped with sensors including a range sensor 30, a three-axis accelerometer 32, a three-axis gyroscope 34, and a three-axis magnetometer 36. The MSP is moved through the environment in such a way that all planes to be mapped are captured by the field of view of the range sensor.

Each sensor has minimal requirements that must be met to be used for axis mapping, which are described below. The data output from certain sensors is processed before being used for axis mapping. The range sensor 30 is used to produce point clouds (i.e., an array of points in 3D space). The point clouds are generated at a high enough rate relative to the motion of the MSP in order to consider all points in a single point cloud to have been measured from a single orientation of the MP. The three-axis accelerometer 32 measures the acceleration of the MSP in three perpendicular axes. It may comprise three accelerometers (one per axis). The three-axis gyroscope 34 measures the angular velocity of the MSP in three perpendicular axes. It may comprise three gyroscopes (one per axis). The frequency of the sensor is high enough such that that the angular velocity of the MSP may be assumed to be constant between measurements. The three-axis magnetometer 36 measures the local magnetic field in the proximity of the sensor in three perpendicular axes. It may comprise three magnetometers (one per axis). The accelerometer, gyroscope, and magnetometer may be contained in a single sensor (e.g., an inertial measurement unit (IMU)). If the coordinate frames of the accelerometer, gyroscope, and magnetometer are not aligned, the rotation between their respective coordinate frames must be known.

Axes of planar surfaces are extracted 40 from the point cloud measured by the range sensor. This involves first removing outliers in the point cloud, estimating the axis at each point in the point cloud, and then removing points whose axes are determined not to be part of a planar surface. Similar axes are then clustered together 54 using, e.g., the DBSCAN algorithm (M. Ester, et al., "A density-based algorithm for discovering clusters in large spatial databases with noise," in *Proceedings of the 2nd International Conference on Knowledge Discovery and Data Mining*. AAAI Press, 1996, pp. 226-231) to generate a small number of axes representing all the planar surfaces measured by the sensor.

The output of the accelerometer is normalized 42 to determine the direction of the external accelerations acting on the MSP. This direction is assumed to be the direction of gravity, with extra uncertainty in the observation being included if additional external forces acting on the MSP are detected. The output of the gyroscope is integrated 44 to estimate changes in orientation of the MSP. The uncertainty of this observation is proportional to the length of time between measurements made by the range sensor. The output of the magnetometer is normalized to determine the direction of the Earth's magnetic field. The magnetometer is calibrated beforehand to compensate for soft and hard iron distortions.

(ii) An initial estimate of the 3D orientation of the MSP in the global coordinate frame (North, East, down) is calculated 50, 52 from the observed directions of gravity and the Earth's magnetic field using, e.g., the factored quaternion algorithm (FQA) (X. Yun, et al. "A simplified quaternion-based algorithm for orientation estimation from earth gravity and magnetic field measurements", *IEEE Transactions on Instrumentation and Measurement,* 2008, vol. 57, pp. 638-650). An orientation is estimated at the time of each measurement by the range sensor.

(iii) After an initial estimate of the orientation of the MSP is available at each range sensor measurement, all axes extracted from the point clouds are transformed to the global reference frame. At this point, similar axes are clustered together 54 (i.e., they are associated) to form a small number of distinct axis observations. The axes observed at each orientation are marked with which axis they are observing.

(iv) A graph is generated 56 that links nodes (orientations of the MP, planar axes in the environment, and the constant directions of gravity and the Earth's magnetic field in the global coordinate frame) with edges (one edge per observation). There are four types of observations: (a) rotations between consecutive orientations (from integrating the gyroscopes), (b) planar axes in the environment (from processing the point clouds generated by the range sensor), (c) the direction of gravity at each orientation (from normalizing the accelerometers), and (d) the direction of the Earth's magnetic field at each orientation (from normalizing the magnetometers) 58. Each observation is now associated with an orientation in the graph.

(iv) A prediction of each observation is generated 60 from the initial guess of the orientations. For example, a prediction of the integrated gyroscope observation of the rotation between sequential orientations is the rotational difference between the initial guesses of those orientations. The difference between observations and their predictions is the error of the observation 62. The goal of error minimization 64 is to determine the orientations that result in the minimum squared error of all the observations simultaneously. As an example, the Levenberg-Marquardt algorithm (W. H. Press, et al., *Numerical Recipes: The Art of Scientific Computing,* 3rd ed., Cambridge University Press, 2007) may be used for this purpose. The result is an optimized estimate 66 of the sequence of orientations undergone by the MP during data collection.

(v) Given the optimized estimate of the sequence of orientations resulting from error minimization, an axis map in the global frame is generated 68. A small number of axes were observed at each orientation (i.e., the axes resulting from axis extraction, as described in (i). The axes are rotated to the global coordinate frame using the optimized orientations. In other words, now that the orientation of the MSP is known at the time of each range sensor measurement, the measurements themselves can be expressed in the global coordinate frame. A stereonet is simply one parameterization these measurements. The axes are converted to points and plotted on a stereonet 70 via a change of variables.

Example 3

Figure 12:
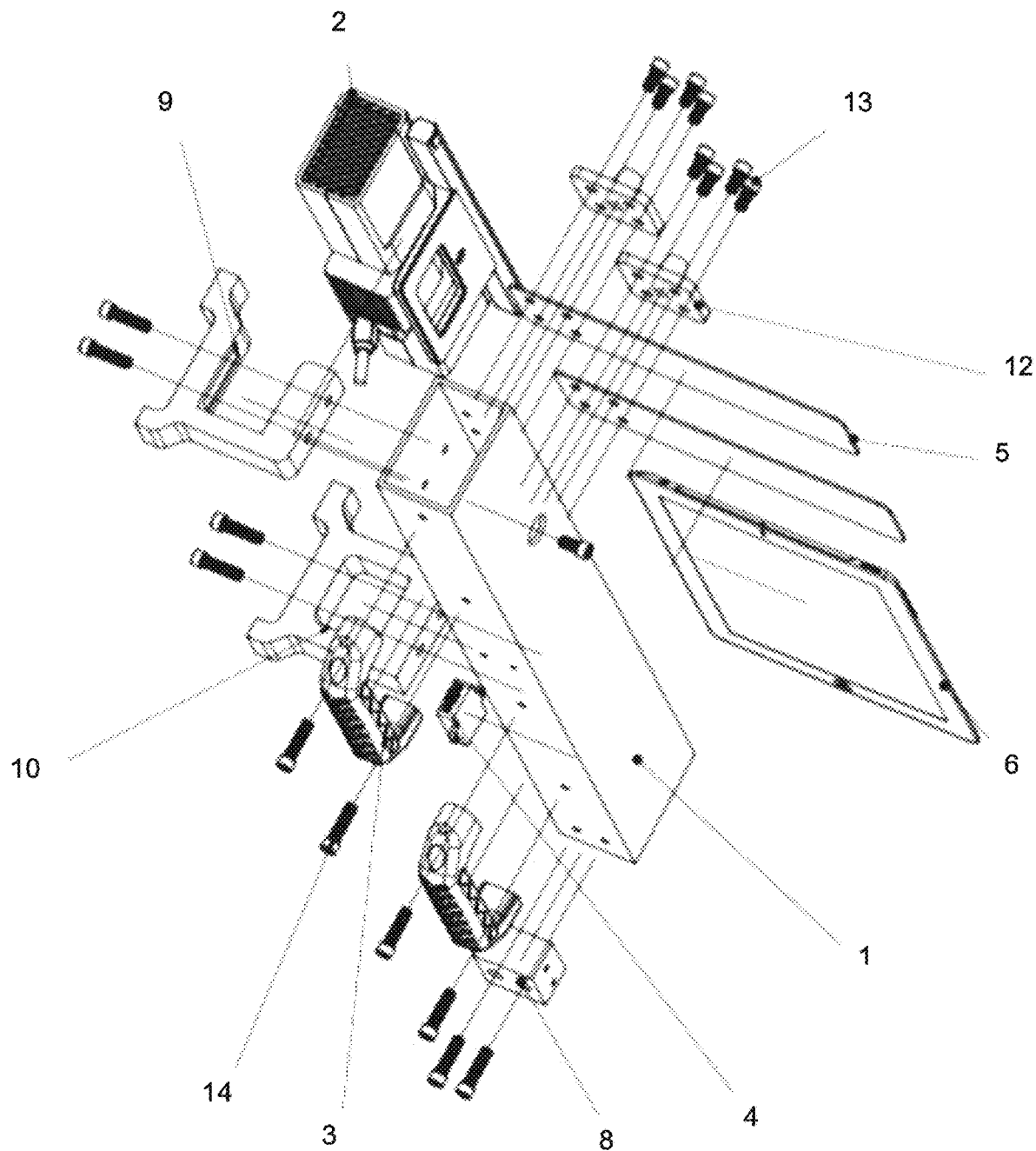
FIG. 12 is an engineering drawing of a prototype MSP according to one embodiment.

A prototype MSP was constructed using substantially off the shelf parts, as shown in the engineering drawing of FIG. 12. Main components are listed in Table 1 (item numbers as in FIG. 12). The MSP was interfaced with an Apple iPad tablet computer.

TABLE 1

Parts list for MSP prototype
PARTS LIST

| ITEM | QTY | PART NUMBER |
|---|---|---|
| 1 | 1 | Aluminum tube |
| 2 | 1 | KinectOne |
| 3 | 2 | Handle |
| 4 | 1 | 3DM-GX3-25-IMU |
| 5 | 2 | ipad_mount |
| 6 | 1 | iPAD 4 |
| 8 | 1 | hinge_block |
| 9 | 1 | kinect_leg |
| 10 | 1 | bottom_leg |
| 12 | 2 | ipadleg |
| 13 | 9 | 0.25-28screw0.5 in |
| 14 | 10 | 0.25-28screw1 in |

Figure 13A:
FIG. 13A is a photograph of a rock face used to evaluate the embodiment of FIG. 12.
Figure 13B:
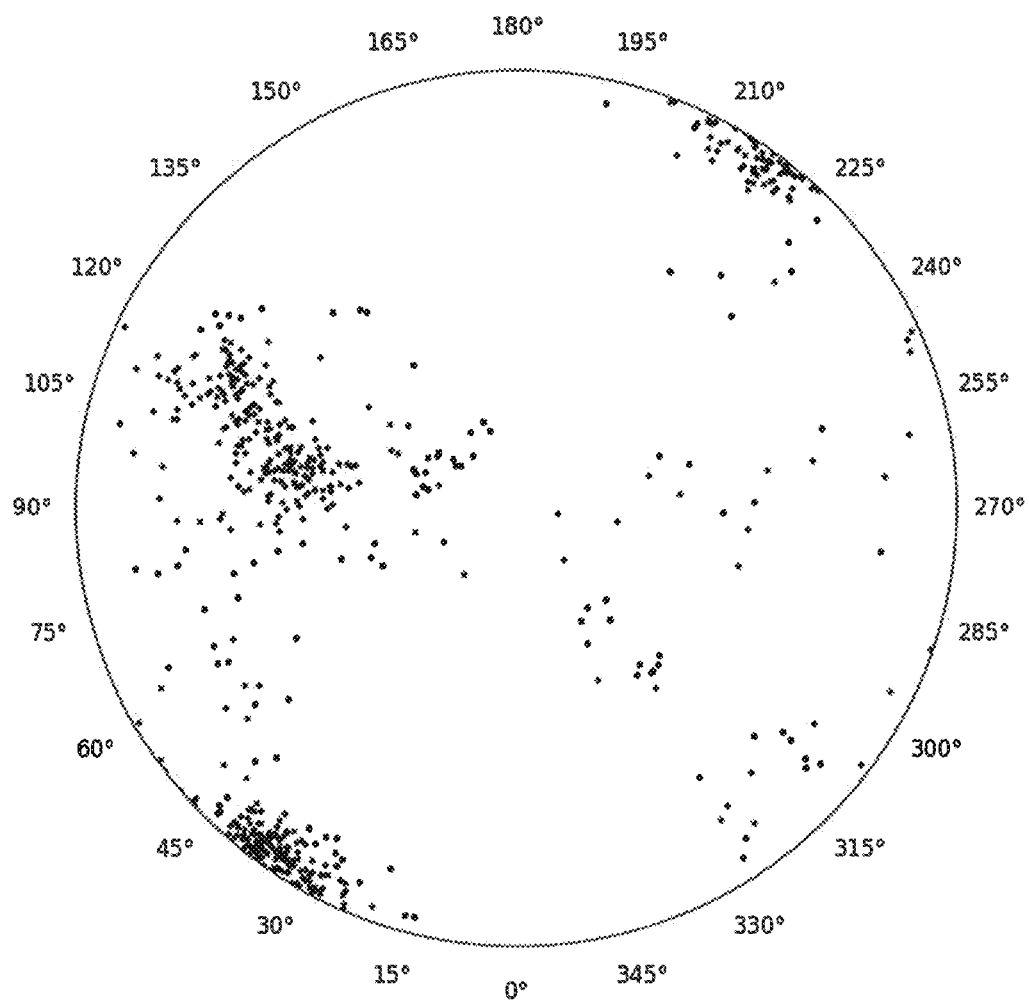
FIG. 13B is a stereonet corresponding to the rock face of FIG. 13A, produced by the embodiment of FIG. 12.
Figure 14A:
FIG. 14A is a photograph of another rock face used to evaluate the embodiment of FIG. 12.
Figure 14B:
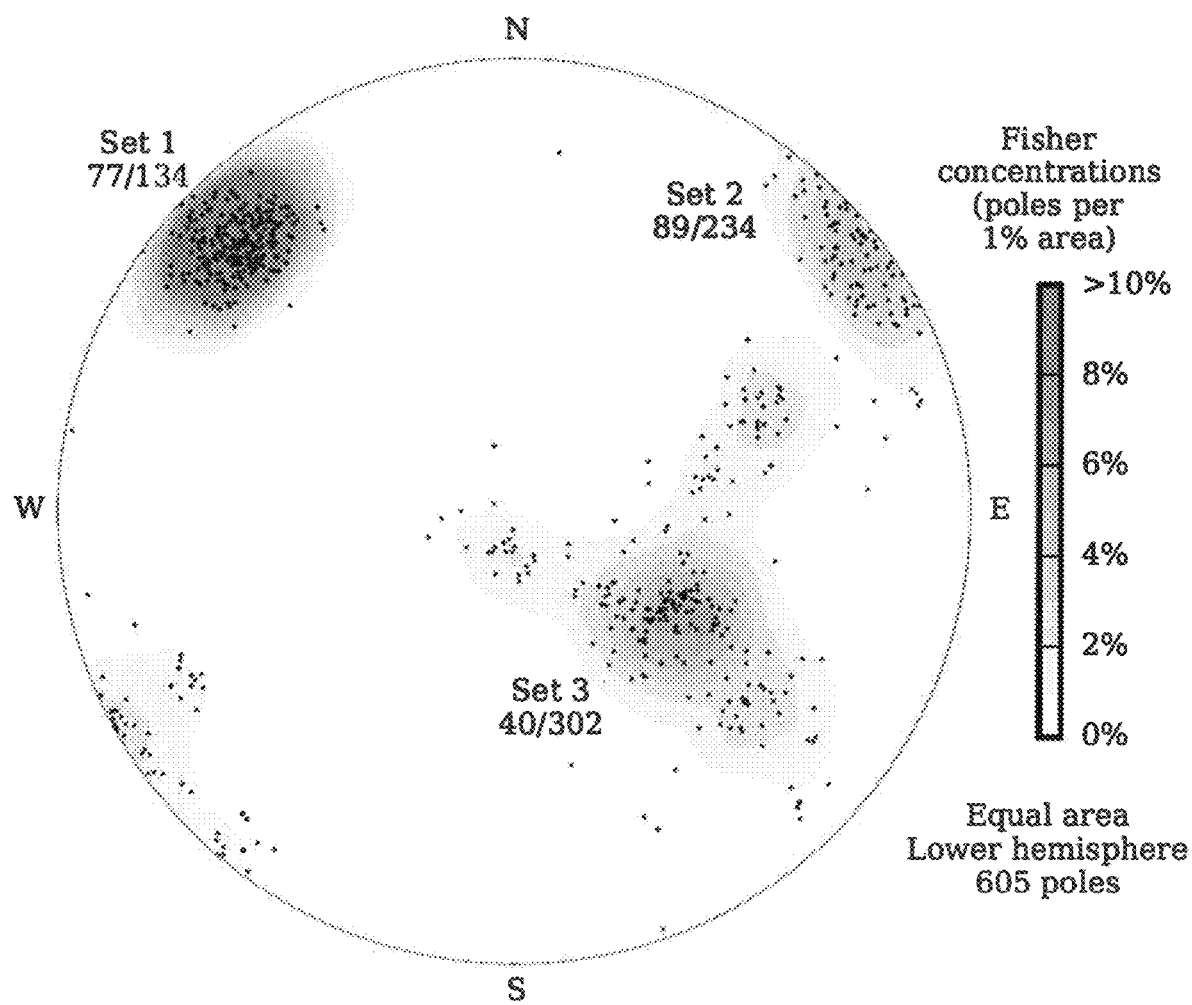
FIG. 14B is a stereonet corresponding to the rock face of FIG. 14A, produced by the embodiment of FIG. 12.

Two rock faces (FIGS. 13A and 14A) near Kingston, Ontario, Canada were scanned with the MSP. A field notebook and compass are included in the photograph of FIG. 13A for scale. The stereonets of FIGS. 13B and 14B, respectively, were produced as outputs.

All cited publications are incorporated herein by reference in their entirety.

EQUIVALENTS

While the invention has been described with respect to illustrative embodiments thereof, it will be understood that various changes may be made to the embodiments without departing from the scope of the invention. Accordingly, the described embodiments are to be considered merely exemplary and the invention is not to be limited thereby.

The invention claimed is:

1. Apparatus for generating a representation of planar surfaces in a physical environment, comprising:
   a mobile sensor platform (MSP) including sensors that output sensor signals, wherein the sensors sense distance to planar surfaces in the environment, direction of gravity, direction of the Earth's magnetic field, and angular velocity, and the MSP is adapted to be moved through the environment;
   a processor that receives and processes the sensor signals, and:
   (i) for each time step of a sequence of time steps, uses the sensed distance to planar surfaces in the environment to extract observations of axes that define orientations of the planar surfaces;
   (ii) for each time step of the sequence of time steps, uses the sensed directions of gravity and the Earth's magnetic field and angular velocity to estimate orientation of the MSP without positional information, and clusters together observations of axes that define orientations of the planar surfaces at each time step that are of similar orientation to observations of axes at other time steps; and
   (iii) minimizes uncertainty in the clustered observations of axes that define orientations of the planar surfaces and in the estimates of the MSP orientations by linking the estimates of the MSP orientations, the clustered observations of axes that define orientations of the planar surfaces, and the sensed directions of gravity and the Earth's magnetic field, and generates a set of optimized estimates of the orientations of the planar surfaces; and an output device that outputs the representation of the physical environment as axes that define the orientations of planar surfaces in the physical environment based on the set of optimized estimates of the orientations of the planar surfaces.

2. The apparatus of claim 1, wherein the representation of the physical environment comprises one or more of an axis map, a visual representation, and a data set.

3. The apparatus of claim 1, wherein the representation of the physical environment comprises a stereonet.

4. The apparatus of claim 3, wherein the output device produces the stereonet by transforming the observed axes to a global coordinate frame using the optimized orientation estimates.

5. The apparatus of claim 1, wherein the MSP comprises a handheld device, a robot, an unmanned aerial vehicle, or a non-robotic vehicle.

6. The apparatus of claim 1, wherein the sensors comprise a range sensor, a three-axis accelerometer, a three-axis gyroscope, and a three-axis magnetometer.

7. The apparatus of claim 6, wherein the range sensor comprises a scanning laser rangefinder, LiDAR, time of flight (ToF) camera, stereo camera system, or other range sensing device.

8. The apparatus of claim 1, wherein the physical environment comprises a rock face.

9. Programmed media for use with a computer, the programmed media comprising a computer program stored on non-transitory storage media compatible with the computer, the computer program containing instructions to direct the computer to:

receive data produced by a plurality of sensors on a mobile sensor platform (MSP) moving through an environment, the data corresponding to sensed parameters of distance to planar surfaces in the environment, direction of gravity, direction of the Earth's magnetic field, and angular velocity;

process the data by:
(i) for each time step of a sequence of time steps, use the sensed distance to planar surfaces in the environment to extract observations of axes that define orientations of the planar surfaces;
(ii) for each time step of the sequence of time steps, use the sensed directions of gravity and the Earth's magnetic field and angular velocity to estimate orientation of the MSP without positional information, and clusters together observations of axes that define orientations of the planar surfaces at each time step that are of similar orientation to observations of axes at other time steps;
(iii) minimize uncertainty in the clustered observations of axes that define orientations of the planar surfaces and in the estimates of the MSP orientations by linking the estimates of the MSP orientations, the clustered observations of axes that define orientations of the planar surfaces, and the sensed directions of gravity and the Earth's magnetic field, and generate a set of optimized estimates of the orientations of the planar surfaces; and output a representation of the environment as axes that define the orientations of planar surfaces in the environment based on the set of optimized estimates of the orientations.

10. The programmed media of claim 9, wherein the output comprises one or more of an axis map, a visual representation, and a data set.

11. The programmed media of claim 9, wherein the output comprises a stereonet.

12. A method for generating a representation of planar surfaces in a physical environment, comprising:

using a mobile sensor platform (MSP) including sensors that output sensor signals, wherein the sensors sense distance to planar surfaces in the environment, direction of gravity, direction of the Earth's magnetic field, and angular velocity, and the MSP is adapted to be moved through the environment;

using a processor to receive and process the sensor signals, and:
(i) for each time step of a sequence of time steps, uses the sensed distance to planar surfaces in the environment to extract observations of axes that define orientations of the planar surfaces;
(ii) for each time step of the sequence of time steps, use the sensed directions of gravity and the Earth's magnetic field and angular velocity to estimate orientation of the MSP without positional information, and clusters together observations of axes that define orientations of the planar surfaces at each time step that are of similar orientation to observations of axes at other time steps; and
(iii) minimize uncertainty in the observations of axes that define orientations of the planar surfaces and in the estimates of the MSP orientations by linking the estimates of the MSP orientations, the clustered observations of axes that define orientations of the planar surfaces, and the sensed directions of gravity and the Earth's magnetic field, and generate a set of optimized estimates of the orientations of the planar surfaces; and output the representation of the physical environment as axes that define the orientations of planar surfaces in the physical environment based on the set of optimized estimates of the orientations of the planar surfaces.

13. The method of claim 12, wherein the processor builds a graph that links the MSP orientations, the axes that define orientations of the planar surfaces in the environment, and the directions of gravity and the Earth's magnetic field.

14. The method of claim 12, wherein the output representation of the physical environment comprises one or more of an axis map, a visual representation, and a data set.

15. The method of claim 12, wherein the output representation of the physical environment comprises a stereonet.

16. The method of claim 15, comprising producing the stereonet by transforming the observed axes to a global coordinate frame using the optimized orientation estimates.

17. The method of claim 12, comprising moving the MSP through the environment so that axes to be mapped are captured by a field of view of the sensor that senses distance to planar surfaces in the environment.

18. The method of claim 12, wherein the MSP comprises a handheld device, a robot, an unmanned aerial vehicle, or a non-robotic vehicle.

19. The method of claim 12, wherein the sensors comprise a range sensor, a three-axis accelerometer, a three-axis gyroscope, and a three-axis magnetometer.

20. The method of claim 19, wherein the range sensor comprises a scanning laser rangefinder, LiDAR, time of flight (ToF) camera, stereo camera system, or other range sensing device.

21. The method of claim 12, wherein the physical environment comprises a rock face.

* * * * *